(12) United States Patent
Wagoner et al.

(10) Patent No.: US 7,944,068 B2
(45) Date of Patent: May 17, 2011

(54) OPTIMIZING CONVERTER PROTECTION FOR WIND TURBINE GENERATORS

(75) Inventors: Robert G. Wagoner, Roanoke, VA (US); Allen M. Ritter, Roanoke, VA (US); Anthony M. Klodowski, Hardy, VA (US); Scott C. Frame, Boones Mill, VA (US); Steven W. Sutherland, Roanoke, VA (US); Sidney A. Barker, Troutville, VA (US); Werner Barton, Gescher (DE)

(73) Assignee: General Electric Company, Schenectady, NY (US)

( * ) Notice: Subject to any disclaimer, the term of this patent is extended or adjusted under 35 U.S.C. 154(b) by 529 days.

(21) Appl. No.: 12/164,662

(22) Filed: Jun. 30, 2008

(65) Prior Publication Data

US 2009/0322083 A1    Dec. 31, 2009

(51) Int. Cl.
*F03D 9/00* (2006.01)
*H02P 9/00* (2006.01)

(52) U.S. Cl. .............................. 290/44; 322/44

(58) Field of Classification Search ............. 290/44, 290/55; 415/2.1, 4.2, 4.5, 907; 416/132 B; 322/44, 59, 24; 307/17, 36, 77, 128
See application file for complete search history.

(56) References Cited

U.S. PATENT DOCUMENTS

| | | | | |
|---|---|---|---|---|
| 4,274,043 A * | 6/1981 | Heitz | ............... | 320/117 |
| 7,446,435 B2 * | 11/2008 | Zhang et al. | .............. | 307/105 |
| 7,508,089 B2 * | 3/2009 | Guang et al. | ............... | 290/44 |
| 7,518,256 B2 * | 4/2009 | Saragueta et al. | .............. | 290/44 |
| 7,782,015 B1 * | 8/2010 | Aaron | .............. | 320/123 |
| 7,800,248 B2 * | 9/2010 | Kramer et al. | ............... | 307/65 |
| 2006/0214428 A1 * | 9/2006 | Altemark et al. | ............... | 290/44 |
| 2007/0073445 A1 * | 3/2007 | Gonzalez et al. | .............. | 700/286 |
| 2007/0121353 A1 * | 5/2007 | Zhang et al. | ............... | 363/39 |
| 2009/0322081 A1 * | 12/2009 | Wagoner et al. | ............... | 290/44 |
| 2009/0322082 A1 * | 12/2009 | Wagoner et al. | ............... | 290/44 |
| 2010/0231040 A1 * | 9/2010 | Schweitzer, III | .............. | 307/24 |

* cited by examiner

*Primary Examiner* — Julio Gonzalez
(74) *Attorney, Agent, or Firm* — Edward J. Smith; Ernest G. Cusick; Frank A. Landgraff (57) ABSTRACT

An integrated fault and personnel protection system and method for a multi-thread converter in a wind turbine power system is provided. The structure and method provide for system optimization, as well as, arc flash protection. Fault sensing with means of removing power applied to the converter minimizes the energy available to produce an arc flash event. Sensing and disconnects devices for the protections are provided close to the source of energy to protect more of the system. Converter controls detect, identify and isolate faults selecting the best combinations of the novel specific fault isolation devices. Components are distributed into separate physical to enhance protection.

20 Claims, 11 Drawing Sheets

OPTIMIZING CONVERTER PROTECTION FOR WIND TURBINE GENERATORS

BACKGROUND OF THE INVENTION

The invention relates generally to wind turbine generators and more specifically to a system and method for integrated fault and personnel protection system for wind turbine power systems providing output to a load.

Generally, wind turbines use the wind to generate electricity. The wind turns multiple blades connected to a rotor. The spin of the blades caused by the wind spins a shaft of the rotor, which connects to a generator that generates electricity. Specifically, the rotor is mounted within a housing or nacelle, which is positioned on top of a truss or tubular tower, which may be as high as about 100 meters. Utility grade wind turbines (e.g., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is provided to a utility grid. Some turbines utilize generators that are directly coupled to the rotor without using a gearbox. Various types of generators may be used in these wind turbines.

Many devices, such as wind turbines, include power converter systems. A power converter system is typically used to convert an input voltage, which may be fixed frequency alternating current, variable frequency alternating current, or direct current, to a desired output frequency and voltage level. A converter system usually includes several power semiconductor switches such as insulated gate bipolar transistors (IGBTs), integrated gate commutated thyristors (IGCTs or GCTs), or metal-oxide semiconductor field effect transistors (MOSFETs) that are switched at certain frequencies to generate the desired converter output voltage and frequency. The converter output voltage is then provided to various loads. Loads as used herein are intended to broadly include motors, power grids, and resistive loads, for example.

To accommodate the need for greater power from windfarms, individual wind turbine generators are increasingly being provided with higher power output capability. To accommodate the higher power output from the wind turbine generators, some wind turbine systems are provided with multiple parallel converters (also known as converter threads). Multiple parallel converters may also provide an advantage in wind converters due to the desire for high availability and low distortion Typically, power converter systems use multiple power converter bridges in parallel with gating control to expand power-handling capability. In wind turbine applications, a power converter bridge usually refers to a three-phase converter circuit with six power switches. In order to meet both grid side and machine side power quality requirements, such systems generally use large and costly filters to smooth out pulse width modulated waveforms. Such systems sometimes cause overheating of the generator and/or transformers and other distortion-sensitive equipment due to high harmonic components, when the large and costly filters are minimized.

Figure 1:
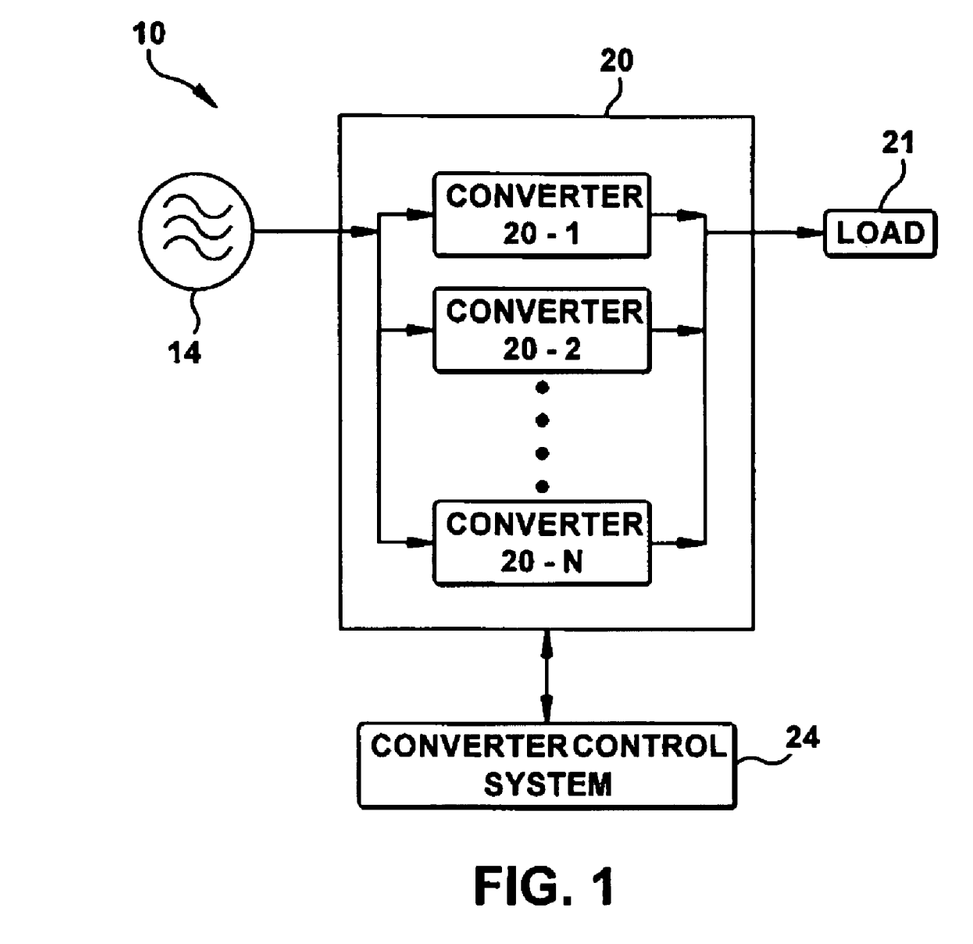
FIG. 1 illustrates a typical multi-thread power converter system for a wind turbine application.

FIG. 1 is a block diagram of a typical power system employing multiple parallel converters. Wind turbine power system 10 is configured for supplying power to a load 21, which may be an electric power grid. A generator source 14 is configured to generate an AC input power. The AC input power is provided to power converter system 20. The power converter system 20 comprises converters 20-1 through 20-N. The converters are coupled in parallel and configured to receive the AC input power from the generator source 14. The power converter system 20 is configured to convert the AC input power to an AC output power. The AC output power is provided to load 21.

For cost and size reasons, each thread is connected to a common point on the grid and the plant with conductors that are usually sized in accordance with the rating of each thread and not the system rating.

Converter control system 24 is configured to provide control signals for the operation of the power converter system 20. The converter control system is coupled to the converter system and is configured to drive the converter system according to predesignated switching patterns. The predesignated switching patterns provided by the converter control system may provide for synchronous gating of the multiple parallel converters or may provide an interleaved manner of control for each converter thread with phase displaced gating signals to reduce overall switching harmonic components due to cancellation of phase shifted switching waveforms.

Figure 2:
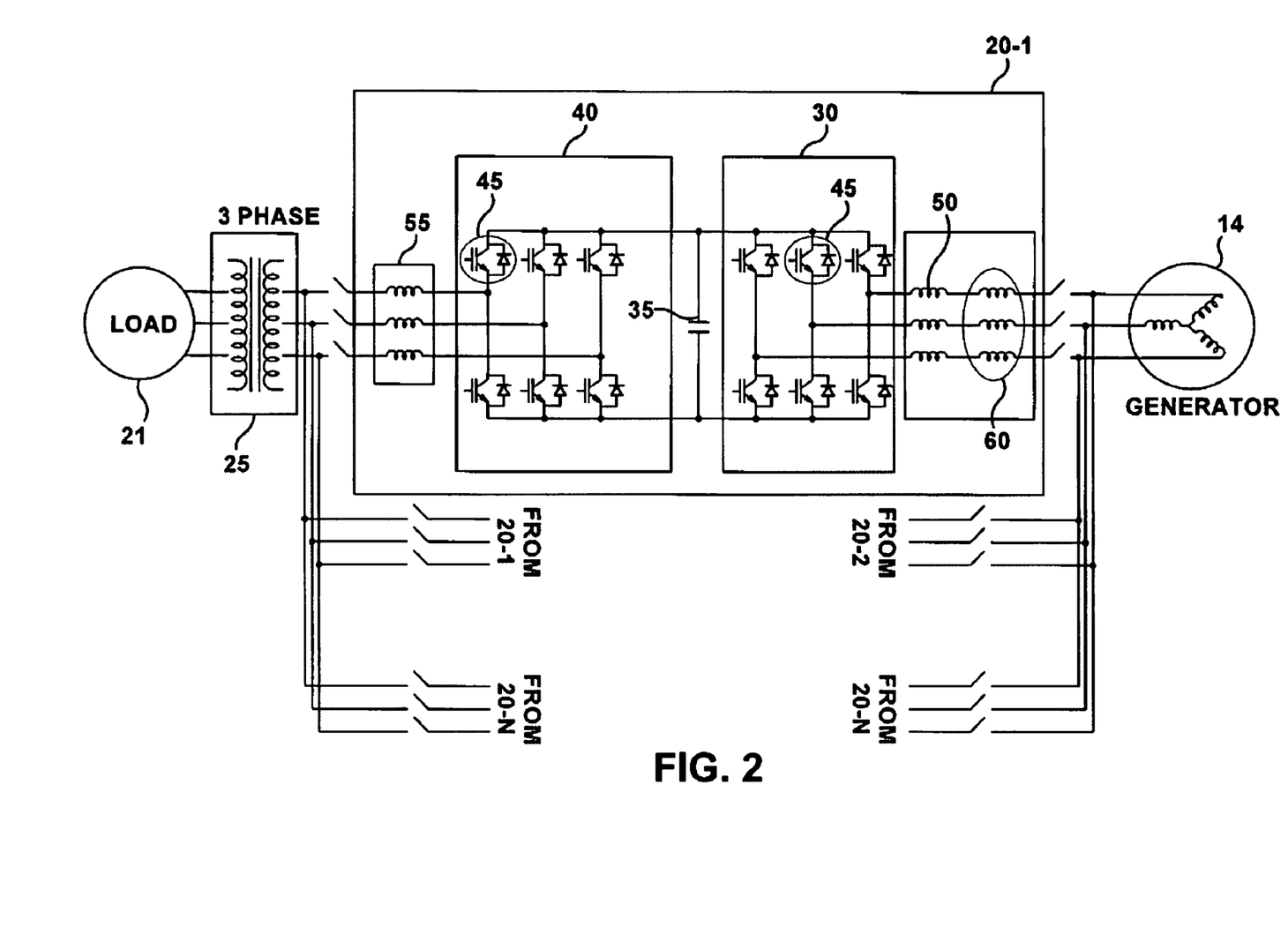
FIG. 2 is a block diagram of one typical thread of a power converter system.

FIG. 2 is a block diagram of one typical thread of a power converter system. Wind turbine embodiments, for example, typically comprise three-phase power converter systems. Converter 20-1 represents one thread of power converter system 20. Converter thread 20-1 comprises generator-side converter bridge 30 for AC-DC conversion, DC link 35, and load-side converter bridge 40 for DC-AC conversion to a suitable voltage and frequency. Generator converter bridge 30 may be implemented using six semiconductor power switches 45. Similarly, load-side bridge 40 may be implemented using six semiconductor power switches 45. Generator-side chokes 50 and load-side chokes 55 may be sized to enable either non-interleaved or interleaved gating.

Switching of the power semiconductor switches in the converter threads causes a difference in voltage between the parallel converters, which creates a common mode current that flows between the converter threads, even without having a ground fault on the system. Operating pulse width modulated converters in shifted modulation phase can be made to produce similar power conducting currents while reducing the low frequency distortion current when the two converters are connected to the generator or grid through combining reactors. This allows a reduction of additional distortion reduction equipment, like passive filters, insulation and conductors to be reduced. However, while the net (result of the combination of converters) distortion current is reduced, the individual converter circulating current is worsened.

A common mode current will flow in a circular loop between the power converter threads, but not have any impact on the net current in either the grid or the plant. Common mode chokes 60 suppresses the high frequency (switching frequency range) common mode cross current that links both generator-side converters and the load-side converters.

Figure 3:
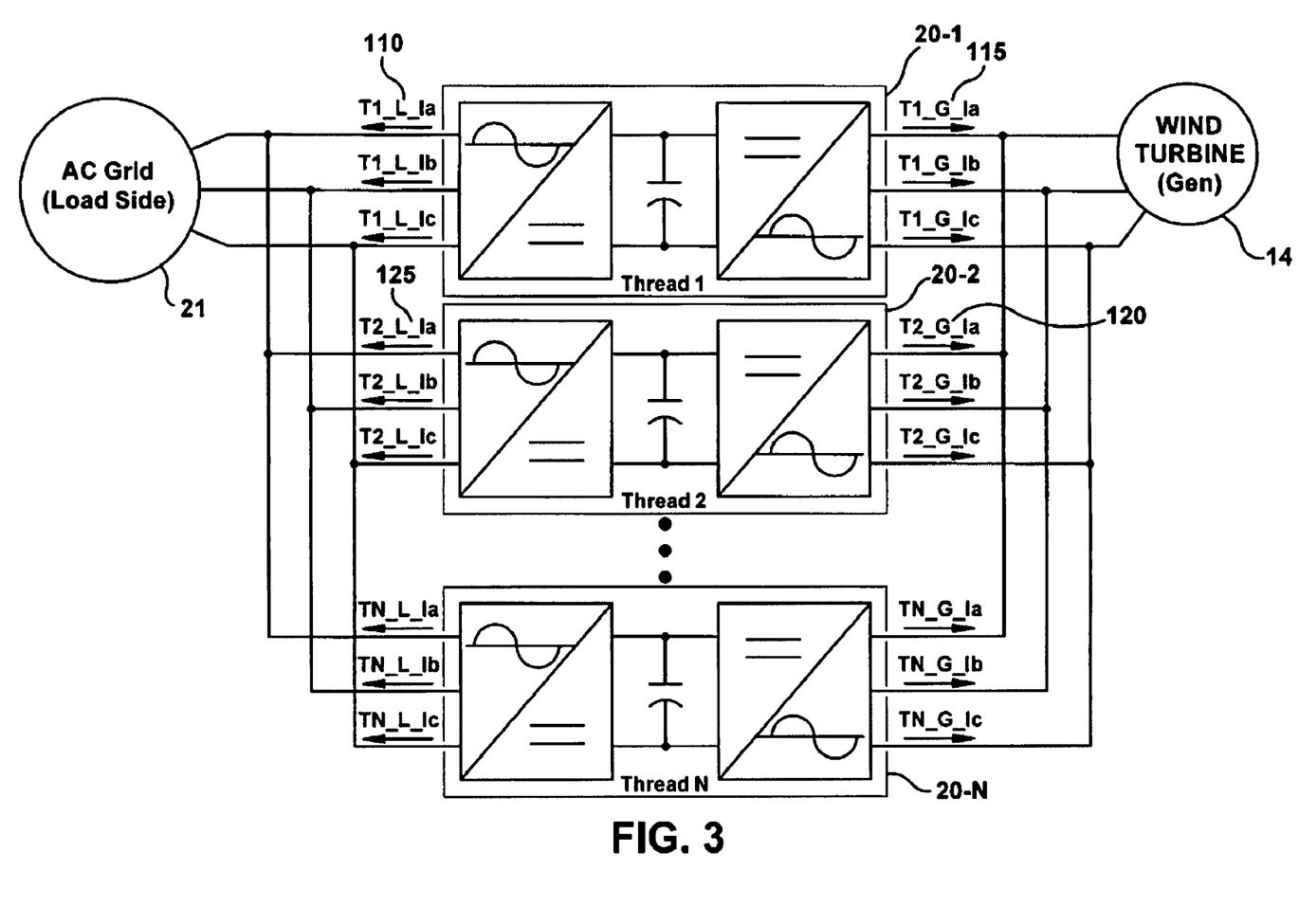
FIG. 3 illustrates common mode current flow in a power system converter with n-paralleled converter threads connected to a grid and to a wind turbine generator.

FIG. 3 illustrates common mode current flow in a power system converter with n-paralleled converter threads (20-1 to 20-n) connected to a grid 21 and to a wind turbine generator 14. For example, it is possible that a current can flow into thread T1_L_Ia 110 and out T1_G_Ia 115 and return through thread T2_G_Ia 120 and T2_L_Ia 125. There are many combinations of loops for such current that will not affect the net current. However, these common mode currents, as well as normal mode circulating currents, force converter switching devices and other components to operate closer to thermal limits.

Further, these common mode currents may cause a direct error in the measurement of ground fault currents of that loop, thereby making fault detection more difficult. Normally, the sum of phase currents for galvanically isolated three phase subsystems should be zero. However, for a subsystem, such as an individual converter thread, the common connection of the individual converter threads on the generator-side and on the load-side can result in a non-zero summation of currents due to common mode currents flowing between threads.

Not only is the system unlike the more normal three-phase system, in that the distortion current higher, but it is also unlike the three phase system in that neither the summation of the phase grid side current, nor the generator-side current be assured to near zero when the grid side and the generator-side currents are combined through reactors without bulky additional isolated windings in transformers and/or generator.

Fault protection based on detection of currents differentiated for "normal" three phase sine waves has to deal with high distortion and non-zero summation of three phase current. Yet, protection of individual three phase converter threads requires rapid fault detection, isolation and repair.

Figure 4:
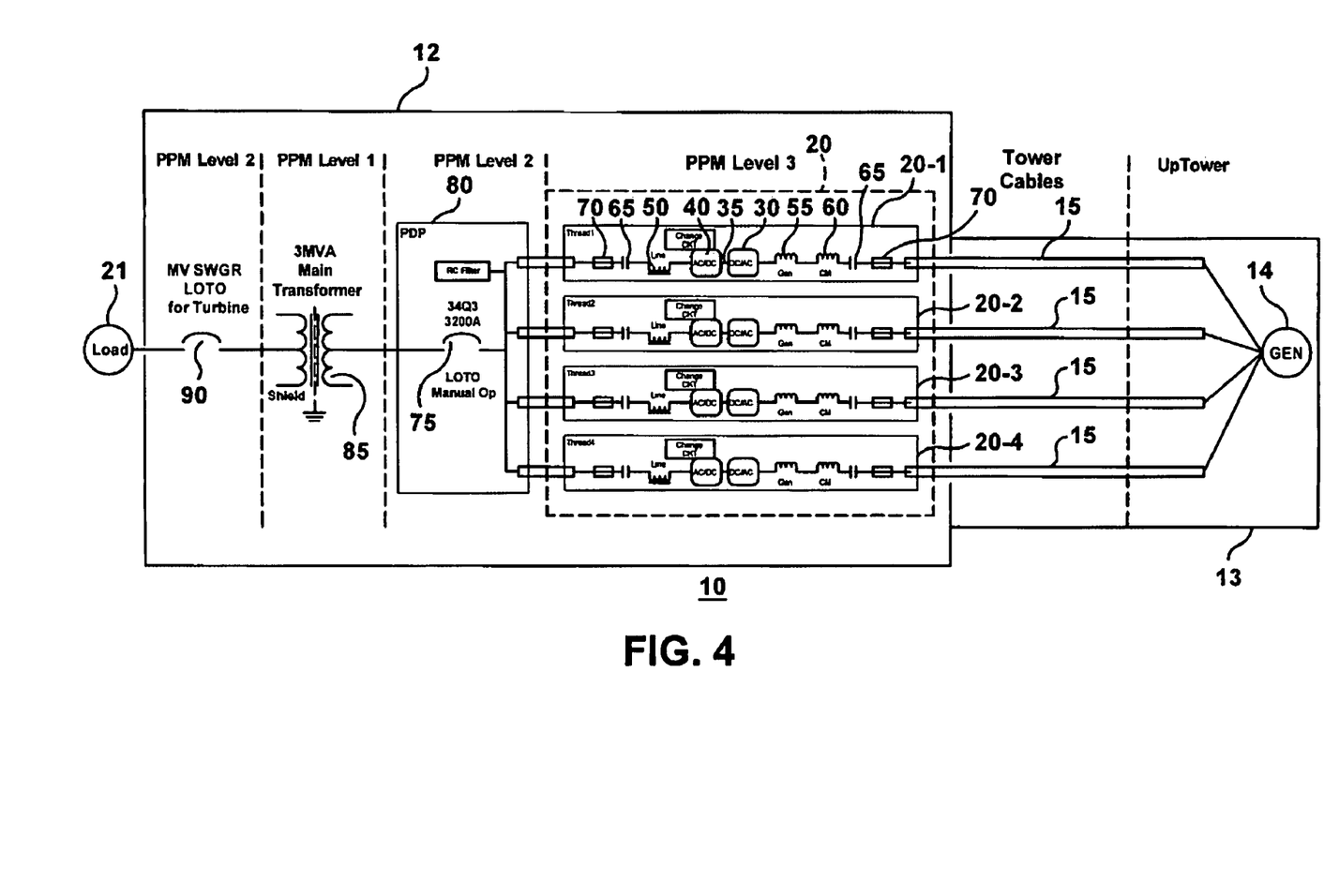
FIG. 4 illustrates a typical power converter system for utility power applications, including a three-phase generator-side converter for AC-DC conversion and a three-phase load (or grid) side converter to invert DC-AC.

FIG. 4 illustrates a typical wind turbine power system 10 with a power converter system 20 for utility power applications, including a three-phase generator-side converter for AC-DC conversion and a three-phase load (or grid) side converter to invert DC-AC, with a DC link interposed. Three-phase AC power, generated by the wind turbine generator 14 at the top of the tower 13, is connected along the height of the tower through tower cables 15 to power conversion equipment and controls, which may generally positioned towards lower levels 12 of the tower 13, in one or more power plant machinery (PPM) levels.

Multiple parallel converter threads 20-1 to 20-4 are provided to accommodate the power conversion requirements of the wind turbine generator 14. A typical converter thread 20-1 may include, a generator-side (AC-DC) converter 30, the DC link 35 and a load-side (DC-AC) converter 40, with accompanying charging circuits 27. On the generator-side of these converter elements, a common mode filter 60 may be provided to minimize common mode currents circulating between the individual converter threads. A generator-side filter 50 and a load-side filter 55 may be provided to reduce distortion of the voltage waveforms on the respective side of the converter. Surrounding these elements, line contactor 60 may provide control for isolating the converter threads. Further, fuse protection 70 may be provided on the ends of the converter thread 20-1, generally in physical proximity to the converter thread 20-1. Converter threads 20-2, 20-3 and 20-4 are similarly arranged.

The converter threads 20-1 to 20-4 may be connected on the load-side to a manually operated circuit breaker 75 located, for example, in electrical distribution panel 80 in proximity to the base of the wind turbine tower. The manually operated circuit breaker 75 may provide isolation from grid side power and capability for lockout-tagout at the electrical distribution panel 80 during maintenance. The manually operated circuit breaker 75 may also provide overcurrent trip capability. The manually operated circuit breaker 75 may be connected on the load-side to a main transformer 85 for transforming the converter power output to a common bus voltage for the windfarm in which the wind turbine is located. An isolation circuit breaker 90 for the wind turbine power system 10 may also be provided in the base of the wind tower for isolation of the wind tower from grid side power with overcurrent trip capability and lockout-tagout capability.

The typical structure for a wind turbine electric power output as previously described in FIG. 4 suffers from a number of deficiencies including: 1) lack of circuit protection for the tower cables 15 from the wind turbine generator source 5; 2) the generator-side converter cable entry may be subject to arc flash hazard, has no circuit protection from the wind turbine generator source 5, and lock-out tagout provisions for protection from the generator source 5 must be exercised by climbing the tower to apply a brake; 3) contactors within the converter do not supply isolation for the converter; 4) fuse protection for the load-side converter is potentially subject to a high ionized arc during fault conditions that may interfere with fault interruption; 5) the cable entry for the load-side converters may be subject to an arc fault hazard; 6) generator-side and load-side cable entrances to the power distribution panels may be subject to arc flash hazard, and generator-side cable size may not be coordinated with circuit protection; and 7) no ground fault circuit protection may not be adequately provided on the load-side cable entry.

Accordingly, there is a need to provide a structure and method for providing protection for wind turbine generator converter systems that will detect faults and distinguish faults under conditions of operation with common mode current and provide protection against catastrophic damage during true fault conditions and also provide personnel protection during fault conditions and maintenance.

BRIEF DESCRIPTION OF THE INVENTION

The present invention relates to a structure and method for providing protection for wind turbine generator converter systems against catastrophic damage during fault conditions and also provide personnel protection during these fault conditions and during maintenance.

According to a first aspect of the present invention, an integrated fault and personnel protection system is provided for a wind turbine power system receiving electric power from a wind turbine generator, mounted atop a wind turbine tower and interconnected by tower cables to a power converter system mounted at a lower level of the wind turbine tower, providing a power output to a load. The system includes a wind turbine generator configured to generate an alternating current power input and a power converter system coupled to the wind turbine generator and configured to generate a voltage and frequency output power and provide the output power to the load. The power converter system includes a generator-side-converter system with a plurality of parallel generator-side converters, each connecting to the generator, and a load-side converter system including a plurality of parallel load-side converters. Each load-side converter may be interconnected with the load;

A converter control system may be coupled to the power converter system and configured to drive the power converter system to reduce harmonic components in the output power and on the alternating current input power. A main transformer may couple the power converter system to the load. At least one motor-operated circuit breaker may be adapted to isolate the wind turbine generator from the parallel generator-side converters. At least one motor-operated circuit breaker may be adapted to isolate the parallel load-side converters from the load. At least one fuse may be provided for fuse protection on the generator-side of the parallel generator-side converters. At lease one fuse may also be provided for fuse protection on the load-side of the parallel load-side converters. An isolation circuit breaker may be provided, adapted for isolating the wind turbine power system from the load.

According to a second aspect of the present invention, an integrated method is provided for fault and personnel protection for a wind turbine power system feeding power output to a load. Such a wind turbine power system may include a wind turbine generator configured to generate an alternating current power input; a power converter system coupled to the wind turbine generator and configured to generate an output power and provide the output power to the load, wherein the power converter system comprises a generator-side converter system including a plurality of parallel generator-side converters, each connecting to the generator, and a load-side converter system including a plurality of parallel load-side converters, each load-side converter interconnected between the respective generator-side converter and the load; a converter control system coupled to the converter system and configured to drive the converter system to reduce harmonic components in the output power and on the alternating current input power; and a main transformer coupling the power converter system to the load. The method includes isolating the wind turbine generator from the parallel generator-side converters with at least one motor-operated circuit breaker in response to predetermined faults; and isolating the parallel load-side converters from the load with a motor-operated circuit the load-side and the generator-side of each parallel converter thread in response to predetermined faults.

The method includes isolating the parallel generator-side converters with fuses in response to predetermined faults and isolating the parallel load-side converters with fuses in response to predetermined faults. The method further includes isolating the wind turbine power system from the load with an isolation circuit breaker adapted to respond to overcurrent faults and ground faults sensed at the main transformer.

According to a further aspect of the present invention, an integrated fault and personnel protection system is provided for a wind turbine power system feeding power output to a load. The wind turbine power system may include a wind turbine generator configured to generate an alternating current power input; a power converter system coupled to the wind turbine generator and configured to generate an output power and provide the output power to the load, wherein the power converter system comprises four converter threads, including a generator-side converter and a load-side converter in each thread; and a converter control system coupled to the converter system and configured to drive the converter system to reduce harmonic components in the output power and on the alternating current input power; and a main transformer coupling the power converter system to the load.

The integrated fault and personnel protection system includes at least one motor-operated circuit breaker adapted to isolate at least one converter thread from a wind turbine generator, including an undervoltage trip coil operated according to commands from a converter control system. It also includes at least one motor-operated circuit breaker, adapted to isolate at least one converter thread from a load, including an undervoltage trip coil operated according to commands from the converter control system. An isolation breaker is provided for power to the wind turbine power system. The isolation breaker is adapted to provide a trip function from a protective relay. The protective relay is adapted to provide a remote trip function to the isolation breaker including a ground fault trip and an instantaneous overcurrent trip.

A plurality of load-side fuses, including one for each converter thread, are provided. The load-side-fuses are positioned remote from the converter thread. A plurality of generator-side fuses, including one for each converter thread, are also provided.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including protecting against catastrophic damage during fault conditions not previously protected for under prior art systems and fault protection analysis and also providing personnel protection during maintenance In wind turbine power conversion systems, there are two major sources of energy that must be considered in a fault scenario: the utility power grid and the wind turbine generator. Protection of the converter from these sources of energy is then a crucial task. Converter protection must also be coordinated in such a way to protect personnel in the event of an arch flash inside the converter during fault conditions. Arc flash events have been experienced in various parallel converters for wind turbine generators in the field.

The present invention provides an improvement in the data processing incorporating an advanced analysis of a multi-thread converter system operation when exposed to faults compared as compared to normal operation. This has been achieved by a deeper understanding normal operation compared to the underling fault events dictating current paths within subsystems intended to be gavanically isolated and the means to detect currents leaving this subsystem combined with a reliable mechanism to interrupt this current.

When the generator-side three-phase currents from all of the converters are summed and the galvanic isolation is intact, the main effect would be due to capacitive related current.

Current in excess of these capacitive effect (as well as the small measurement errors) are indicative of voltage isolation failures and can be interrupted where the isolation means is not compromised by conductive paths due to this same fault. Similarly the sum of the three-phase grid and three-phase generator-side current should remain small so long as galvanic isolation is maintained. Where currents, large compared to capacitive or measuring error, are detected, a failure to maintain voltage isolation, local to one converter subsystem is uncovered. This current can be interrupted where conductive paths due to this same fault do not compromise the isolation means.

While errors in summations (common mode) can be used to identify insulation failures, errors in the individual currents (normal mode) often relate to the loss of control over some aspect of voltage.

As indicated before, multi-threaded shunt converters (multiple three phase converters producing independently instantaneous voltages) produce currents in concert with power, fundamental reactive, imbalance, and distortion. Along with these, more or less, steady state currents, transients will occur when condition or operations change and the control modifies the voltage to re-establish steady state.

The controls ability to maintain, changing but controlled, currents is substantially modified as a result of the shared connections inherent to a multithreaded converter. An obvious example of this additional complexity is that there are more currents to control.

The response for controllable disturbances invokes voltage control that results in the control of current, a detection means for the limits of this control effort, and a means for the interruption of the currents beyond limits of the controller.

The present invention provides a method for using the current sensors internal to direct paralleled converters to detect unintended flow of fault current and to help diagnose whether the source of the fault is an internal device failure, an internal ground fault or a external ground fault in the cables or plant. The intent for the detection of this current is not only to force an appropriate system response to stop the current flow before damage can propagate but also to help diagnose and or isolate the cause of the problem to facilitate repair and or reintroduction of the unit into service. Ground faults can occur on these conductors, internal to the plant or internal to the converter threads; furthermore components internal to the converters threads can fail. It is important that when a fault or failure occurs that the root cause be identified quickly not only to determine the correct system action to stop damage propagation but also to facilitate diagnosis and repair in a timely manner.

As previously described, one of the consequences of parasitic errors or failed power devices internal to a thread in direct paralleled converters is the possibility to conduct a common mode or zero sequence current without having a ground fault on the system. Referring again to FIG. 3, ground fault current is normally measured by the summation of current on the grid side or the summation of current on the plant side of a converter (i.e. GndSig1=T1_L_Ia+T1_L_Ib+T1_L_Ic or GndSig2=T1_G_Ia+T1_G_Ib+T1_G_Ic) but in this case it can seen that the common mode current obscures the original intent of the signal (GndSig1 or GndSig2) and ultimately the cause of a fault.

Figure 5:
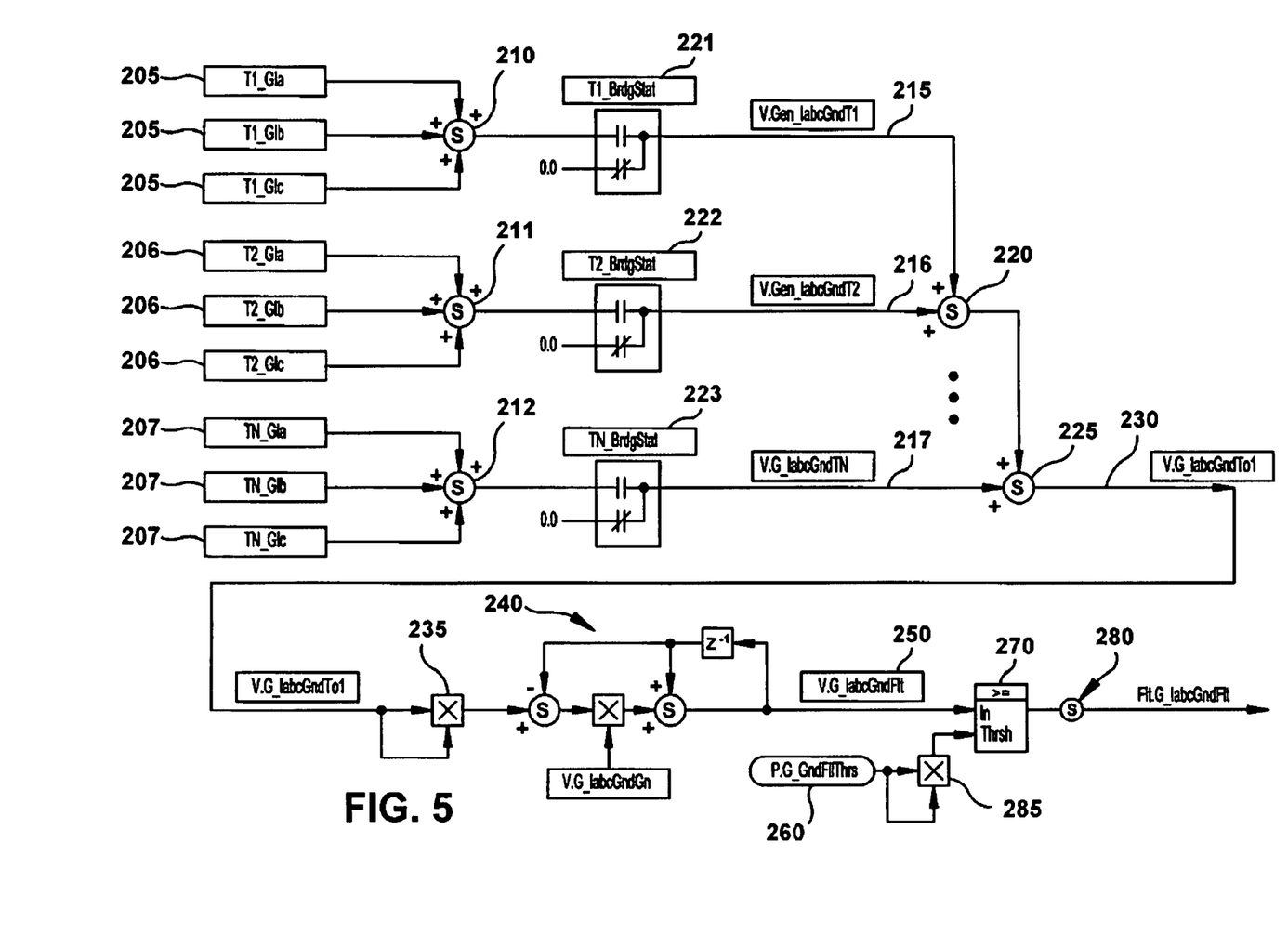
FIG. 5 illustrates a circuit structure for determining a fault current on a load-side or a generator-side of a parallel converter that includes a common mode circulating current.

In order to isolate the cause of the fault and to avoid insertion of extra current sensors the ground fault current in the plant or the cables feeding the plant can be calculated by measuring and summing with summers 210, 211, 212 all of the available currents 205, 206 207 in each thread 20-1, 20-2, 20-n as illustrated by circuit structure 200 of in FIG. 5. The load (or generator) ground fault current 230 for the generator-side (load-side) may be calculated by further summing with summers 220, 225 the summations 215, 216 277 from the individual threads. Each summation of the individual thread currents includes the common mode component of current for that thread, but summation of the currents into a total ground fault current 230 in the above manner automatically compensates for the common mode current that can flow in each thread 20-1, 20-2, 20-n and produces a current signal that indicates the ground current for the plant or its conductors.

An important aspect of the method is that the calculation can be turned off for any particular thread by an isolator 221, 222, 223 when that thread is taken out of service, allowing unimpeded operation of the remaining threads in the event that a thread is taken out of service and the current signals themselves for that thread are in error.

However, summation of the current in this manner obscures the exact path of the current flow and when a ground fault occurs it is important to prevent the damage from propagating unimpeded. In order to avoid over-heating damage to the components (including conductors) by the ground fault current a protection model limits the heating contribution of the ground fault current by squaring 235 the ground current 230, filtering 240, and comparing with comparator 270 the filtered square of the ground current 250 to a trip threshold 260 which is set as the square 265 of the acceptable ground fault current level. Ground fault function 280 may be triggered in response. This threshold level must be based on the smallest component in the branch and is typically driven by size of the conductors used to interconnection each thread to the plant.

One of the important aspects of a ground fault detection scheme is the impact that current sensor errors have on the calculation of the ground current. It can shown that offset errors in the current sensors that do not add to zero will cause a signal that is interpreted as a ground current. To improve the sensitivity of the ground fault detector, a further refinement in the calculation of the ground fault current can be made that ignores the dc component and detect the most likely component of ac current that will flow in a fault.

Figure 6:
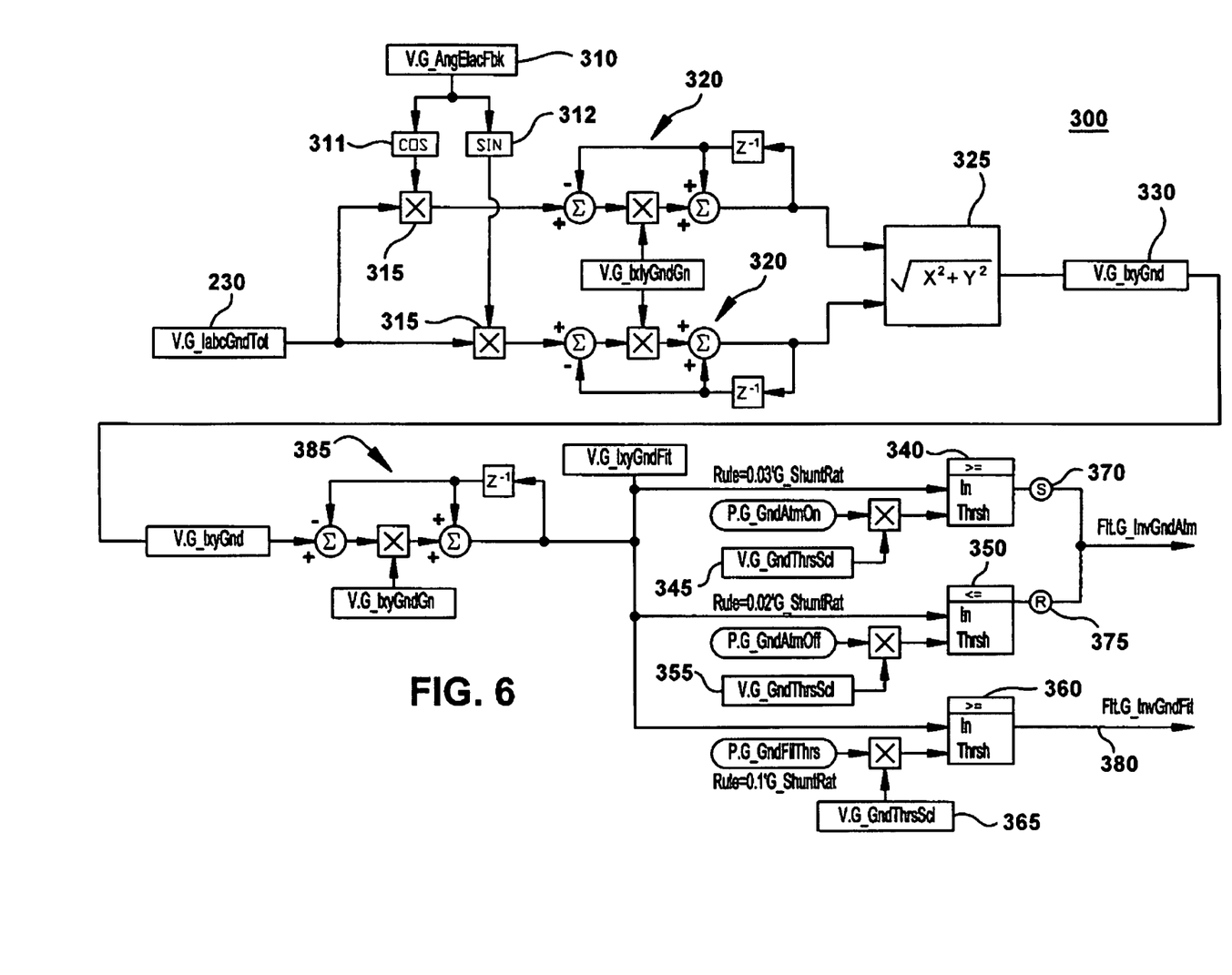
FIG. 6 illustrates a circuit structure to avoid over heating damage created by a ground fault current by comparing the filtered square of the ground fault current to a trip threshold which is set as the square of the acceptable ground fault current level.

Ground faults that occur in the plant (or its conductors) will be fed by a voltage component that modulates with the terminal voltage of the plant, which is impressed by the intended operating condition of the system. For example, a variable speed system will adjust both the amplitude and frequency of the plant's terminal voltage by controlling the power devices internal to the converter. This intended operating condition can be used to further refine the ground current calculation FIG. 6 illustrates a circuit structure 300 to improve sensitivity of the ground fault calculation, in particular for a system with an ac output voltage. The total ground fault current 230 on the generator-side (load side) of the converter is multiplied 311, 312 against the in-phase and quadrature components, respectively, of the ground fault signal 310. These newly formed signals can then be filtered 320 and combined 325 to form ac ground fault signal 330. The ac ground fault signal may be filtered again 335 and compared with comparators 340, 350, 360 to threshold settings 345, 355, 365 which can indicate a fault alarm 370, 375 and fault trip 380 both for protection and diagnostic purposes.

Figure 7:
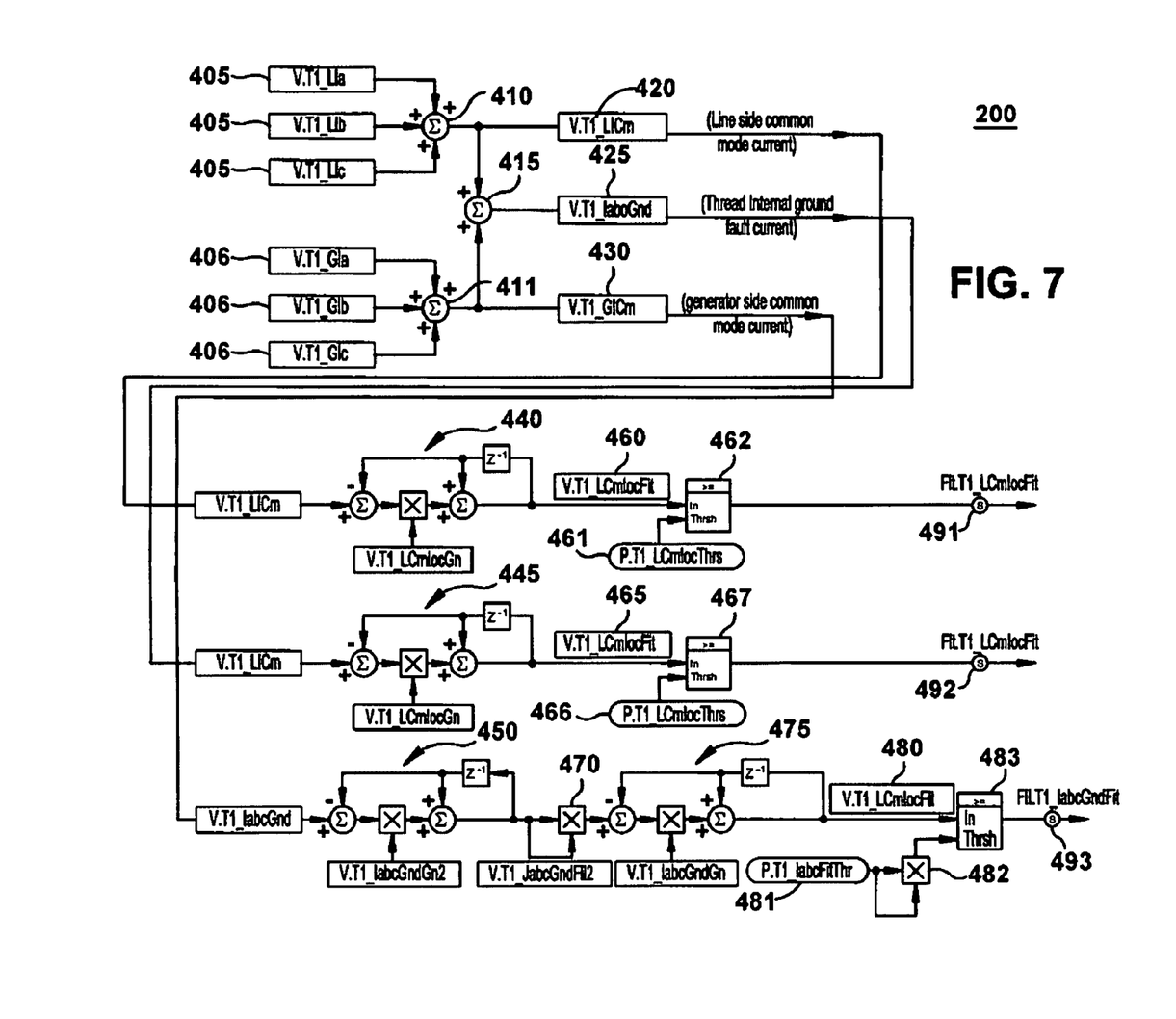
FIG. 7 illustrates a circuit structure to distinguish fault current that flows to ground internal to a thread.

The ground fault scheme above can calculate ground current on the load (generator) side of the thread current sensors but cannot distinguish fault current that flows to ground internal to a thread. This current is obscured by the previously mentioned common mode current and in order to calculate the internal ground fault current, the common mode current must be removed from the signal Calculation of the internal ground current is accomplished by taking the difference in the common mode current on the grid side and the plant side (difference is result of the reference direction defined for currents) as illustrated in FIG. 7. The ground fault current and common mode current internal to each converter thread is calculated as follows: The drawing below may represent the load-side currents phase 405 and the generator-side phase currents 406 from converter thread 20-1 of an exemplary multi-thread system. Again, it is desirable to limit operation of the converter system when an unintended current flows and to distinguish the source of the current. Line side phase currents 405 are summed in summer 410 and generator-side phase currents are summed in summer 411 to yield line side common mode current 420 and generator-side common mode current 430. Line side common mode current 420 and generator-side common mode current 430 are summed in summer 415 to yield the thread internal ground fault current 425. The above currents 420, 425, 430 are each conditioned with filters 440, 445, 450. Thread internal ground fault current 425 may be further squared 470 and filtered again 475. Currents 420, 425 and 430 may then be compared 462, 467, 483 against threshold limits 461, 466 and 481. An appropriate fault 491, 492, 493 is declared to constrain the operation of the system and form diagnostic information. In this case the calculations are done and a separate fault is declared for the current internal to each thread.

The above-principles are applied in the present invention to provide appropriate diagnostic information, alarms and trips appropriate to the protection of equipment and personnel within the system.

The present invention includes new methods of converter protection, which allow for system optimization, as well as, arc flash protection. One aspect of the present invention provides for coordinated fault sensing with means of removing applied to the converter so as to minimize the energy available to produce an arc flash event. Another aspect of this invention is positioning the sensing and disconnects for the protections close to the source of energy to protect more of the system. Converter control software and hardware is utilized to detect, identify and isolate faults using instrumentation native to the converter, in a novel way and extending the state or art beyond presently available "ground detection". Selecting the best combinations of the novel specific protections used, the components are moved into separate physical structures (e.g., cabinets) to enhance protection. For each embodiment, a choice between fuses, circuit breakers, and contactors had been carefully studied to select the preferred method of protecting and disconnecting each area of the system. For each embodiment, a choice between protection sensing, such as ground fault, fast overcurrent trip, slow overcurrent trip and reverse power sensing has been studied to establish the preferred method of sensing faults in each area of the system. The embodiments improve power converter system reliability while simultaneously reducing cost.

In the various embodiments of the protective arrangement, the functional converter thread 20-1, 20-2, 20-3, 20-4 components (AC-DC converter 30, DC link 35, DC-AC 40, common mode filter 60, generator-side filter 50 and load-side filter 55) may remain the same. While in specific embodiments physical placements of protection components may be identified as being located at specific locations such as power plant machinery (PPM) levels, the physical placement for such components need not be limited by these descriptions.

Figure 8:
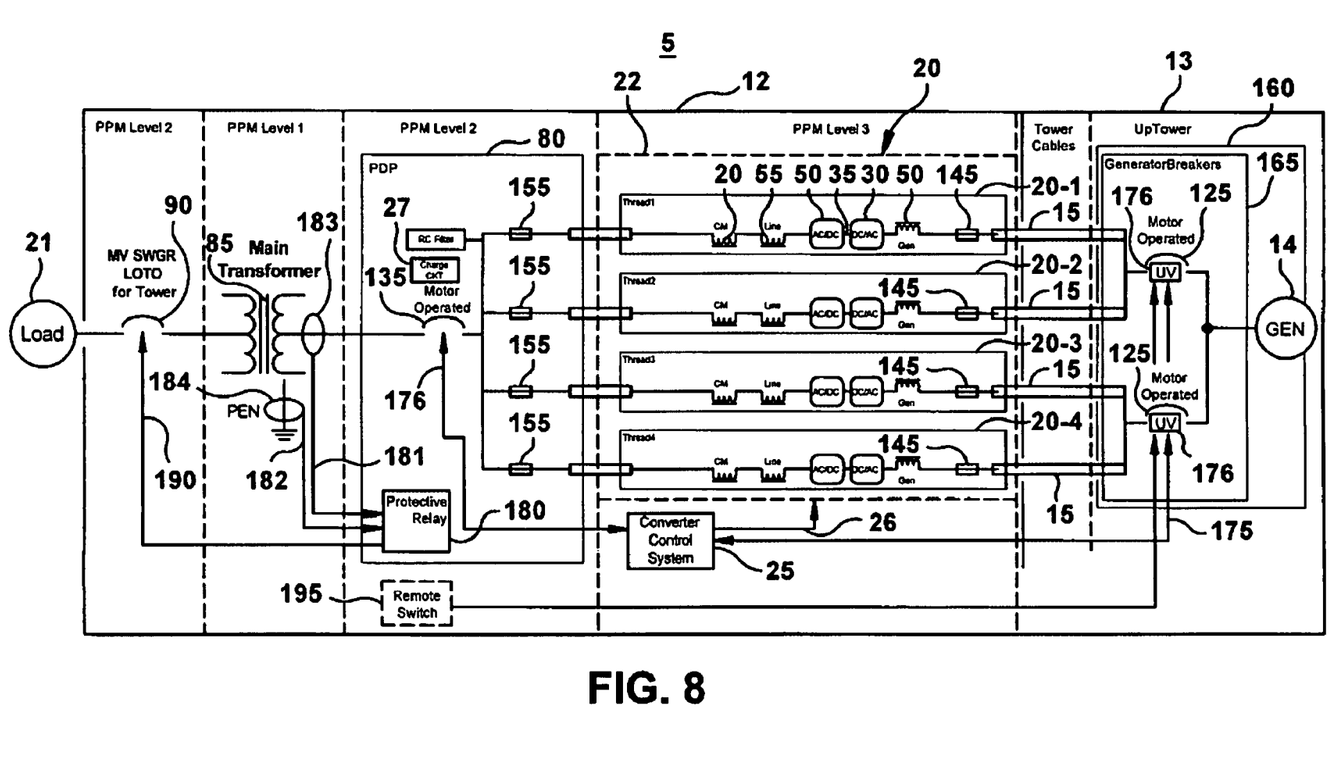
FIG. 8 illustrates a first embodiment of the inventive protective arrangement for an integrated fault and personnel protection system.

FIG. 8 illustrates a first preferred embodiment of the inventive protective arrangement for an integrated fault and personnel protection system 5.

Fuse protection is provided on each side of the parallel converters (threads) 20-1 to 20-4. On the generator-side, fuse protection is provided with a fuses 145 in-line with the generator side of each converter thread, the fuses being located at the converter enclosure. Similarly, on the load-side, fuse protection is provided with a fuse 155 for each converter thread 20-1 to 20-4, where the fuses 155 are located remotely from the converter enclosure 22. Remote location of fuses 155 from the converter enclosure 22 may increase the likelihood that fuses will interrupt properly during fault conditions or arc flash within the converter that may create ionized gases causing arc-over the fuses if the fuses were positioned within the converter enclosure itself. Generator-side converter fuses 145 may also be positioned remote from the converter enclosure 22 based on the same rationale. The fuse protection may include semiconductor fuses including gS class fuses (as defined by the EN 60269-4 standard) delivering reliable $I^2t$ protection against all type of overloads. Arc flash protection for the front of the converter threads is enhanced by addition of covers to air inlets to the converter.

Figure 9:
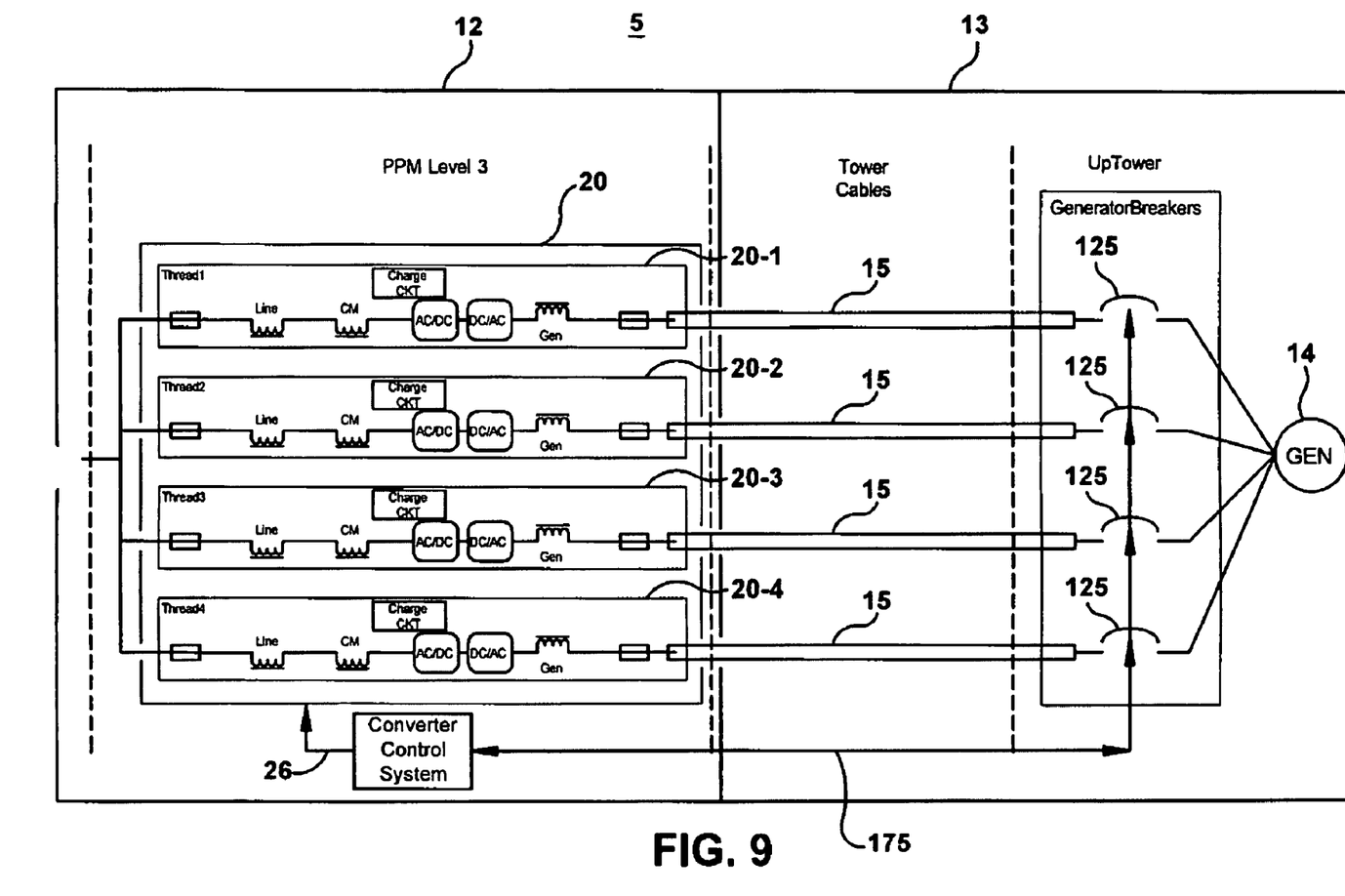
FIG. 9 illustrates a second embodiment providing one motor-operated circuit breaker to isolate the generator-side for each converter thread.

At least one motor-operated breaker 125 may be positioned between the converter 20 and the generator 14. The embodiment illustrated in FIG. 8 includes a motor-operated circuit breaker 125 provided for each pair of converter threads. The motor-operated circuit breakers 125 may be physically located in a nacelle 160, in a machine head assembly 165, directly below the wind turbine generator 14, so as to provide the greatest amount of downstream fault protection. Alternatively, the motor-operated circuit breaker may be provided in any convenient location between the output of the generator 14 and a location where the generator wiring enters the tower. The trip setting for the motor-operated circuit breakers 125 may be set to coordinate for protection of the tower cables 15. The under voltage coil 177 for the motor-operated circuit breakers 125 may be tripped by the individual converter control system functions 175. The motor-operated circuit breakers 125 may alternatively be provided in other configurations, such as providing one motor-operated circuit breaker 125 to isolate the generator-side for each converter thread 20-1 to 20-4, as shown in FIG. 9, or further be provided with as single breaker for isolation of all converter threads (not shown).

The motor-operated circuit breakers 125 may also be tripped by a remote switch located in the tower lower level 12 to provide for lockout-tagout protection. Further the wind turbine generator cable entry area may be constructed so as to minimize the risk of arc flash.

Figure 10:
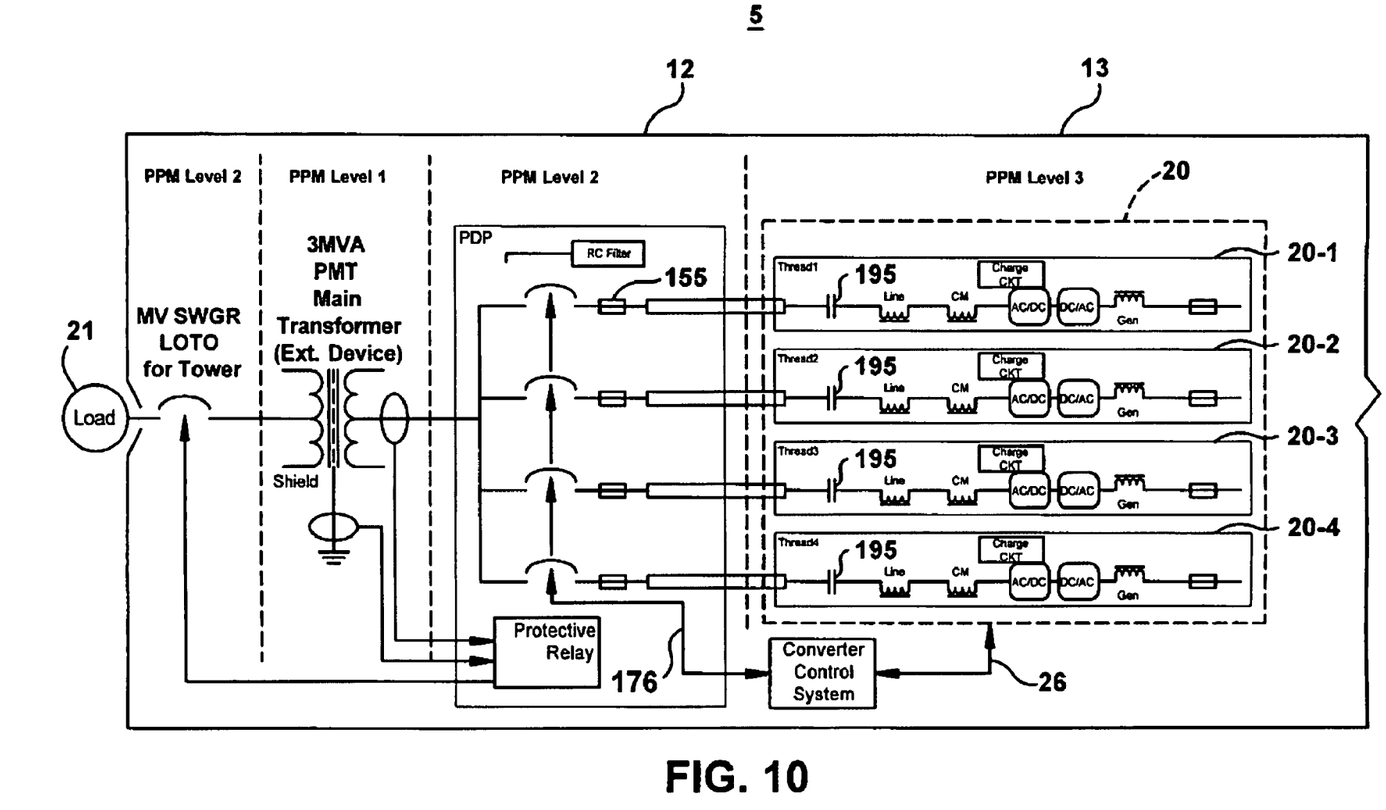
FIG. 10 illustrates a further embodiment of the inventive protective arrangement with one motor-operated circuit breaker 135 may be provided on the load-side for each converter thread.

At least one motor-operated breaker 135 may be positioned between the converter 20 and the load 21. The motor-operated circuit breakers 135 may provide isolation for the converter 20 from power on the load-side of the converter coming from the grid or being provided from other wind turbine power systems in a common windfarm (not shown). In the embodiment of FIG. 8, a single motor-operated circuit breaker 135 may provide isolation for the load-side of the converter 20. The at least one motor-operated circuit breaker 135 may be preferentially located on the load-side of the load-side fuse protection for each converter thread. In other arrangements, a motor-operated circuit breaker 135 may be provided for each pair of converter threads (not shown). Still alternatively, one motor-operated circuit breaker 135 may be provided on the load-side for each converter thread 20-1 to 20-4, as shown in FIG. 10. The under voltage coil 177 for the motor-operated circuit breakers 135 may be tripped by the individual converter control system functions 175.

A manually operated circuit breaker 90 may be provided on medium voltage switchgear (not shown) to isolate the wind turbine power system 10, including the converter, from power of the load 21. The load-side power may include power from the grid and power from other wind turbine power systems connected to a common windfarm. The under voltage coil for the circuit breaker on the MV switchgear may be tripped by a protective relay. A current transformer 183 for line current on the main transformer 85 and a current transformer 184 for neutral to ground line on the main transformer may provide current signal 181, 182 to the protective relay. Using the current signals 182, 183 from these current transformers, the protective relay 180 may provide a trip signal 190 for instantaneous overcurrent and ground fault conditions to manually operated circuit breaker 90. Further, the protective relay 180 may be self-powered.

Figure 11:
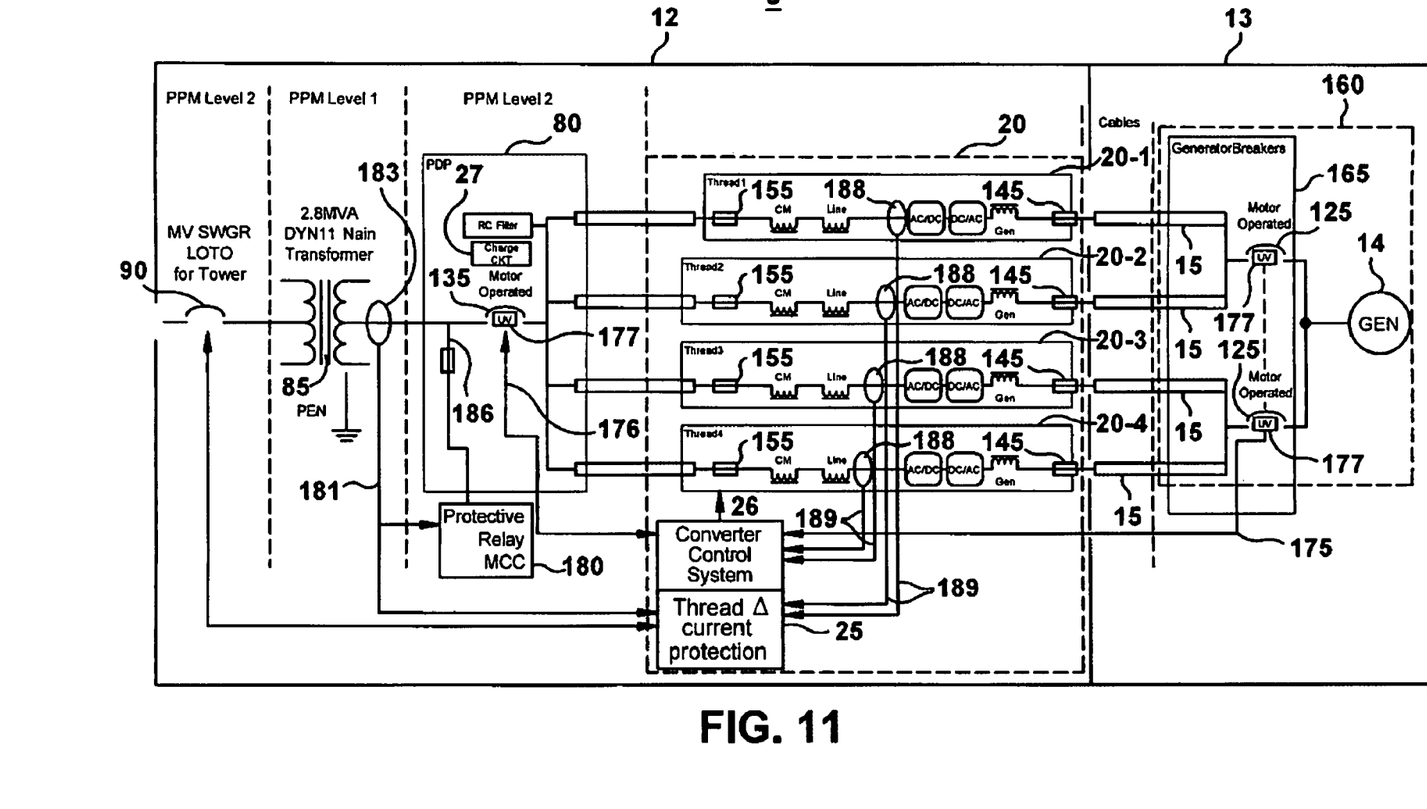
FIG. 11 illustrates another further embodiment of the inventive protective arrangement using a current difference sensed between the individual converter threads and at the main transformer to activate a protective trip.

FIG. 11 illustrates another further embodiment of the inventive protective arrangement using a current difference sensed between the individual converter threads and at the main transformer to activate a protective trip. A current transformer 183 may be provided at the main transformer 85. The current transformer 183 may provide a current signal 181 to protective relay 180, as previously described. However, the current transformer may also provide the current signal 181 to the converter control system 25. The converter control system 25 may provide fault protection due to high differential current in a thread, by comparing the individual thread current 189, as measured by current transformers 183 against the current sensed the main transformer 85. When the differential current exceeds a predetermined limit based on operating condition, the converter control system may trip the motor-operated circuit breaker 135 on the load side of the converter, trip the motor-operated circuit breaker 125 on the generator-side of the converter 20, and/or the medium voltage switchgear circuit breaker 90. Alternatively, the differential current may be compared and measured by a supervisory monitoring relay such as 180 or by an electronic component within a control cabinet. Further, alternative locations may be provided for positioning of the current transformers within the system.

In addition to fuse and circuit breaker protection, another aspect of the invention incorporates modification to mitigate arc flash hazard. The modification includes improving covers for cable connections to minimize hazard to sides of the PDP enclosure. Covers may also be added to air inlets to minimize arc flash hazard in front of the enclosure. Fan ventilation may also be modified within the PDP to promote extinguishing arc flashes.

For the converter enclosure, covers may be added to air inlets to minimize arc flash hazard in the front of the enclosure. Within the converter threads, air ventilation may be enhanced to minimize arc flash hazard in front of the enclosure.

The generator cable entry area may also be arranged to minimize the risk of arc flash by establishing separation between cable and entry components.

While various embodiments are described herein, it will be appreciated from the specification that various combinations of elements, variations or improvements therein may be made, and are within the scope of the invention.

The invention claimed is:

1. An integrated fault and personnel protection system adapted for a wind turbine power system receiving electric power from a wind turbine generator, mounted atop a wind turbine tower and interconnected by tower cables to a power converter system mounted at a lower level of the wind turbine tower, providing a power output to a load, the system comprising:

a wind turbine generator adapted to generate an alternating current power output;

a power converter system coupled to the wind turbine generator and adapted to generate a voltage and frequency power output provided to a load, wherein the power converter system includes a plurality of parallel generator-side converters, each generator-side converter connecting to the wind turbine generator, and a plurality of parallel load-side converters, each load-side converter connecting to the load;

a converter control system coupled to the power converter system and adapted to drive the power converter system to reduce harmonic components in the power output from the power converter system and on the alternating current power output from the wind turbine generator;

a main transformer, coupling the power converter system to the load;

at least one motor-operated circuit breaker adapted to isolate the wind turbine generator from the power converter system;

at least one motor-operated circuit breaker adapted to isolate the power converter system from the load;

at least one fuse for generator-side for fuse protection on the generator-side of the parallel generator-side converters;

at least one load-side fuse for fuse protection on the load-side of the parallel load-side converters; and an isolation circuit breaker adapted for isolating the wind turbine power system through the main transformer to the load.

2. The integrated fault and personnel protection system according to claim 1, wherein the at least one motor-operated circuit breaker adapted to isolate the wind turbine generator from the parallel generator-side converters is physically located in a nacelle for the wind turbine tower.

3. The integrated fault and personnel protection system according to claim 2, wherein the at least one motor-operated circuit breaker is adapted to isolate the wind turbine generator is located in a machine head assembly below the wind turbine generator.

4. The integrated fault and personnel protection system according to claim 2, wherein the plurality of generator-side converters and the plurality of load-side converters comprise: four threads.

5. The integrated fault and personnel protection system according to claim to 4, wherein the at least one motor-operated circuit breaker at the wind turbine generator includes a motor-operated circuit breaker in series with each parallel generator-side converter of the plurality of parallel generator-side converters.

6. The integrated fault and personnel protection system according to claim to 4, wherein the at least one motor-operated circuit breaker at the wind turbine generator includes a motor-operated circuit breaker in series with two parallel generator-side converters of the plurality of parallel generator-side converters.

7. The integrated fault and personnel protection system according to claim 4, wherein the at least one motor-operated circuit breaker at the wind turbine generator output includes an undervoltage trip coil operated according to protective commands from the converter control system.

8. The integrated fault and personnel protection according to claim to 1, further including a switch for lockout-tagout on a local switch panel adapted to trip an undervoltage coil for the at least one motor-operated circuit breaker at the output from the wind turbine generator.

9. The integrated fault and personnel protection system according to claim to 5, further comprising: a cable entrance area for the motor-operated circuit breakers at the wind turbine generator output, including physical separation between circuit elements adapted to reduce arc flash during fault conditions.

10. The integrated fault and personnel protection system according to claim 1, further comprising: grounding means on the wind turbine generator output adapted for personnel protection during maintenance on the wind turbine generator.

11. The integrated fault and personnel protection according to claim to 1, wherein the at least one generator-side fuse for the parallel generator-side converters are physically located remote from the parallel generator-side converters.

12. The integrated fault and personnel protection according to claim to 1, wherein the at least one load-side fuse for the load-side converters are physically located remote from the parallel load-side converters.

13. The integrated fault and personnel protection system according to claim to 1, further comprising: forced ventilation adapted to reduce arc flash hazard in converter.

14. The integrated fault and personnel protection system according to claim to 1, wherein the at least one motor-operated circuit breaker adapted to isolate the parallel load-side converters includes an undervoltage trip coil operated according to protective commands from the converter control system.

15. The integrated fault and personnel protection system according to claim to 14, wherein the at least one motor-operated circuit breaker includes a motor-operated circuit breaker for each of the parallel load-side converters.

16. The isolation circuit breaker coupling the main transformer to the windfarm system according to claim 1, comprising circuit protection including a protective relay adapted to trip the isolation circuit breaker according to a overcurrent trip function and a ground fault trip function on the converter side of the main transformer.

17. A method for providing integrated fault and personnel protection system for a wind turbine power system feeding power output to a load, for a system that includes a wind turbine generator configured to generate an alternating current power input; a power converter system coupled to the wind turbine generator and configured to generate an output power and provide the output power to the load, wherein the power converter system comprises a generator-side converter system including a plurality of parallel generator-side converters, each connecting to the generator, and a load-side converter system including a plurality of parallel load-side converters, each load-side converter interconnected between the respective generator-side converter and the load; a converter control system coupled to the converter system and configured to drive the converter system to reduce harmonic components in the output power and on the alternating current input power, and a main transformer coupling the power converter system to the load; the method comprising:
    isolating the wind turbine generator from the parallel generator-side converters with at least one motor-operated circuit breaker in response to predetermined faults;
    isolating the parallel load-side converters from the load with a motor-operated circuit the load-side and the generator-side of each parallel converter thread in response to predetermined faults;
    isolating the parallel generator-side converters with fuses in response to predetermined faults;
    isolating the parallel load-side converters with fuses in response to predetermined faults; and
    isolating the wind turbine power system from the load with an isolation circuit breaker adapted to respond to overcurrent faults and ground faults sensed at the main transformer.

18. The method for providing integrated fault and personnel protection system according to claim 17, further comprising:
    distinguishing a ground fault current from a common mode circulating current on the generator-side of the plurality of generator-side converters;
    distinguishing a ground fault current from a common mode circulating current on the load-side of the plurality of load-side converters;
    determining a value for the ground fault current on the generator-side of the plurality of generator-side converters;
    determining a value for the ground fault current on the load-side of the plurality of load-side converters;
    comparing a filtered square value for the ground fault current on the load-side against a trip threshold value set as the square of an acceptable ground fault current level;
    comparing a filtered square value for the ground current on the generator-side against a trip threshold value set as the square of an acceptable ground fault current level; and
    intiating at least one of a diagnostic function, an alarm, and a protective trip function in response to exceeding the trip threshold value.

19. The method for providing integrated fault and personnel protection system according to claim 18, further comprising:
    determining the value of ground fault current with a dc component isolated from the determination.

20. The method for providing integrated fault and personnel protection system according to claim 17, further comprising:
    distinguishing a ground fault condition on an individual converter thread from a flow of common mode current circulating between phases;
    determining the value of a generator-side common mode current on the individual converter thread;
    determining the value of a load-side common mode current on the individual converter thread;
    determining the value of a ground fault current on the individual converter thread;
    comparing a filtered square value for the ground fault current on the individual converter thread against a trip threshold value set as the square of an acceptable ground fault current level for the converter thread;
    comparing a filtered square value for the common mode current on the generator-side for individual converter thread against a trip threshold value set as the square of an acceptable ground fault current level for the converter thread;
    comparing a filtered square value for the common mode current on the generator-side for individual converter thread against a trip threshold value set as the square of an acceptable ground fault current level for the converter thread; and
    intiating at least one of a diagnostic function, an alarm, and a protective trip function in response to exceeding the trip threshold value.

* * * * *